(12) United States Patent  
Chopin et al.

(10) Patent No.: US 6,284,033 B1  
(45) Date of Patent: Sep. 4, 2001

(54) INORGANIC RARE EARTH PIGMENTS/ COLORANTS AND SYNTHESIS/ APPLICATIONS THEREOF

(75) Inventors: Thierry Chopin, Saint Denis; Pierre Macaudiere, Asnieres/Seine, both of (FR)

(73) Assignee: Rhone-Poulenc Chimie, Courbevoie Cedex (FR)

( * ) Notice: Subject to any disclaimer, the term of this patent is extended or adjusted under 35 U.S.C. 154(b) by 0 days.

(21) Appl. No.: 08/600,150

(22) Filed: Feb. 12, 1996

Related U.S. Application Data

(63) Continuation of application No. 08/204,513, filed on Mar. 2, 1994, now abandoned.

(30) Foreign Application Priority Data

Mar. 3, 1993 (FR) .................................... 93 02469

(51) Int. Cl.[7] .............................. C01F 17/00; C01G 3/00
(52) U.S. Cl. ........................................... 106/480; 106/461
(58) Field of Search ..................... 106/461, 480

(56) References Cited

U.S. PATENT DOCUMENTS

| | | | |
|---|---|---|---|
| 3,663,245 | * 5/1972 | Bryson | 501/29 |
| 3,793,046 | * 2/1974 | Wanmaker et al. | 106/461 |
| 4,832,724 | * 5/1989 | Borrelli et al. | 501/13 |
| 5,118,659 | * 6/1992 | Lafon et al. | 505/1 |
| 5,228,910 | * 7/1993 | Joyce et al. | 106/450 |
| 5,268,337 | * 12/1993 | Katz et al. | 501/153 |

FOREIGN PATENT DOCUMENTS

| | | |
|---|---|---|
| 0 309 322 | 3/1989 | (EP) . |
| 89/02871 | 4/1989 | (WO) . |
| 89/08335 | 9/1989 | (WO) . |

OTHER PUBLICATIONS

Choy et al, Materials Research Bulletin, vol. 24, No. 7, Jul. 24, 1989, pp. 867–874.
Chemical Abstracts, Abstract No. 142201z, vol. 117, No. 14, Oct. 5, 1992, p. 785.
Chemical Abstracts, Abstract No. 266127d, vol. 116, No. 26, Jun. 29, 1992, p. 745.
Chem. Abs 115:83181 (Grigenaite et al.), Investigation of yttrium barium copper oxides by electron loss spectroscopy., 1990.*
Kirk–Othmer Encyclopedia of Technology, 3rd ed., vol. 17, John Wiley & Sons, New York pp. 825,826, Dec. 1982.*
Physical Ceramics For Engineers, Van Vlack, Addison–Wesley, Reading, Mass., p. 3, Dec. 1964.*

* cited by examiner

*Primary Examiner*—C. Melissa Koslow
(74) *Attorney, Agent, or Firm*—Burns, Doane, Swecker & Mathis, L.L.P.

(57) ABSTRACT

Thermally/chemically stable and nontoxic inorganic pigments/colorants, characteristically green and well suited for the coloration of a wide variety of materials and substrates, for example, plastics, ceramics, etc., comprise at least one mixed oxide of the formula:

$$R_2M_xM'_yO_5$$

in which R is at least one element selected from among yttrium and a rare earth having an atomic number ranging from 62 to 71, inclusive, M and M', which may be identical or different, are each at least one metallic element exhibiting at least one valence state of +2, and x and y are numbers, the sum x+y of which is equal to 2.

28 Claims, 1 Drawing Sheet

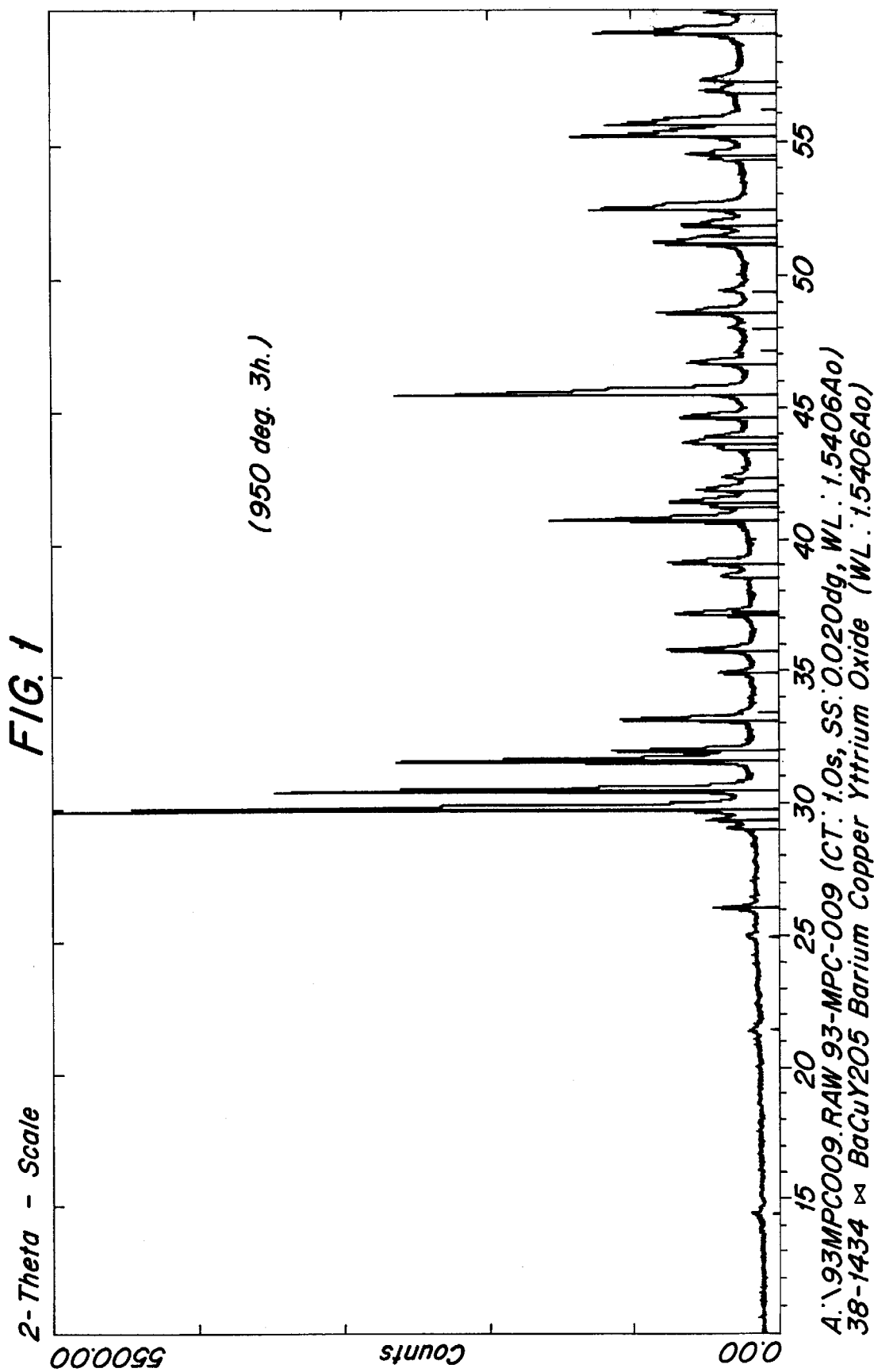

INORGANIC RARE EARTH PIGMENTS/COLORANTS AND SYNTHESIS/APPLICATIONS THEREOF

This application is a continuation of application Ser. No. 08/204,513, filed Mar. 2, 1994, now abandoned.

BACKGROUND OF THE INVENTION

1. Field of the Invention

The present invention relates to novel inorganic pigments/colorants based on rare earths, and more especially, to novel inorganic pigments/colorants based essentially on mixed oxides of rare earths and of divalent metallic elements, exhibiting, on the one hand, very good chromatic characteristics, in particular a remarkable green color and, on the other, the advantage of an absence and/or virtual absence of toxicity.

This invention also relates to a process for the preparation of such pigments and to the use thereof for the coloration of a variety of materials/substrates.

2. Description of the Prior Art

Inorganic pigments/colorants are currently widely employed in many industries, especially in those of paints, plastics and ceramics. For such applications their properties, inter alia, of thermal and/or chemical stability, dispersibility (ability of the product to properly disperse in a given medium), chromaticity, tint strength and covering or masking power are particularly important criteria to be taken into consideration in the selection of a suitable pigment.

Unfortunately, of the inorganic pigments which are suitable for applications such as those indicated above and which are today actually employed on an industrial scale generally comprise metals (cadmium, lead, chromium, cobalt in particular), the use of which is becoming increasingly strictly controlled, or even prohibited, by legislation in many countries; this, at least in part, is due to their toxicity which is widely known to be very high. This is the case as regards red pigments based on cadmium selenide and/or cadmium sulfoselenide, and the case in respect of constituents based on rare-earth sulfides, as well as that of green pigments which present the advantage of, in most instances, containing chromium, particularly in the form of cobalt chromite, of Victoria Green (chromium-based garnets) or chromium(III) oxide.

Thus, serious economic and industrial need continues to exist for substitute inorganic pigments devoid of the above disadvantages and drawbacks.

SUMMARY OF THE INVENTION

Accordingly, a major object of the present invention is the provision of a novel class of inorganic pigments, in particular of green color, containing no elements widely known for their high toxicity, which are thermally and chemically stable and which are well suited for the coloration of many materials and substrates.

Another object of this invention is the provision of a process for the synthesis of such novel class of inorganic pigments that can be carried out on an industrial scale, simply, economically, reproducibly and controllably.

Briefly, the present invention features novel inorganic pigments/colorants comprising at least one mixed oxide of the formula $R_2M_xM'_yO_5$ in which R is at least one element selected from among yttrium and the rare earths of atomic numbers ranging from 62 to 71, inclusive, M and M', which may be identical or different, are each at least one element selected from among metallic elements which exhibit at least one valence state of +2, and x and y are two numbers, preferably integers, whose sum x+y must be equal to 2.

BRIEF DESCRIPTION OF THE DRAWING

The FIGURE of Drawing is an X-ray diffraction pattern of a novel rare earth pigment/colorant according to the present invention.

DETAILED DESCRIPTION OF BEST MODE AND PREFERRED EMBODIMENT OF THE INVENTION

More particularly according to the present invention, it has now unexpectedly been determined that the above mixed oxides could be employed successfully as pigments/colorants by reason of their numerous desirable and advantageous properties such as, in particular, thermal stability at temperatures ranging up to 1,500° C., good chemical stability in media such as water (at neutral, basic or weakly acidic pH) and organic solvents, a wide range of intrinsic colors with green dominants, a very good tint strength, a very good hiding or covering power, and a very good dispersibility, especially in plastics and ceramics.

The present invention also features a process for the synthesis of the subject novel pigments/colorants which comprises:

(i) formulating a mixture containing, in solution and in the required stoichiometric proportions, soluble salts of all of the elements (R, M and M') constituting the composition of the desired mixed oxide, (ii) drying the mixture thus obtained, (iii) calcining the dry product, and then (iv) optionally grinding and/or disintegrating the calcined product.

The process according to the invention produces, as end product, directly after the calcination step, materials which, among other characteristics, exhibit an excellent phase purity, a very good chemical homogeneity (especially in respect of the adjustment to the desired stoichiometry), and a fine and uniform particle size. The grinding step permits obtaining, in its own turn, and if need be, and controlling the particle size of the final powders at values which are suitable for particular applications.

As hereinbefore indicated, the pigments according to the invention are based on mixed oxides corresponding to the general formula

$$R_2M_xM'_yO_5$$

in which R, M, M', X and y are as defined above.

X and y are preferably two integers.

In this latter event, and taking account of the limited number of discrete values capable of being assumed by the variables x and y (0 or 1) and the additional proviso of the arithmetic sum thereof (x+y=2), the preferred mixed oxides according to the invention correspond to defined typical compounds in which the stoichiometry may therefore be 2-1-1-5 (ternary mixed oxides) or 2-2-5 (binary mixed oxides). Their structure can be readily and clearly identified by x-ray diffraction analyses.

According to the invention, the rare earth elements are selected, alone or mixed, from among yttrium and the heavy rare earths of atomic numbers ranging from 62 to 71, inclusive, namely, samarium, europium, gadolinium, terbium, dysprosium, holmium, erbium, thullium, ytterbium and lutetium.

The preferred rare earth element for the pigments according to the invention is yttrium.

The elements M and M' are selected from among metallic elements which have at least one valence state of +2. Exemplary such elements include the alkaline earth elements, especially magnesium, calcium, strontium and preferably barium, nickel, copper, zinc, cobalt and the precious metals, especially platinum and palladium.

Among the metallic elements which have at least one divalent state and which are therefore suitable for the present invention, preferred are those which do not exhibit any officially recognized toxicity to man and/or the environment, such as, for example, the alkaline earth elements and more particularly barium.

It will be appreciated that the preferred pigments according to the present invention are those which are based on mixed oxides corresponding to the formula $Y_2BaCuO_5$ and/or $Y_2Cu_2O_5$.

All of the pigments of the invention exhibit the common characteristic of having a chromaticity with a dominant in the green.

Depending on the nature of the rare earth(s) selected and/or of the divalent metal cations used, it is possible, after simple routine tests, to provide an entire range of green hues exhibiting different shades, and this, of course, enhances the value of the pigments/colorants according to the present invention. It is thus possible to provide pigments ranging from a deep green to a green verging either on blue or on yellow.

Exemplary hues which are attained with the pigments of the invention, without implying any limitation, include that provided by the mixed oxide of formula $Y_2BaCuO_5$ which corresponds to a green verging slightly on yellow; the mixed oxide of formula $Y_2Cu_2O_5$ corresponds to a green verging on blue; and the mixed oxide of formula $Yb_2BaCuO_5$ corresponds to a green which is quite dark.

The intrinsic color of the pigments according to the invention can, furthermore, be quantified by means of the chromaticity coordinates L*, a* and b* set forth in the 1976 CIE (L*,a*,b*) system as defined by the International Commission on Illumination and reported in the French Standards Collection (AFNOR), calorimetric hue no. X08-12 (1983). These are determined by means of a colorimeter marketed by the Pacific Scientific Company. The nature of the illuminant is D65. The observation surface is a circular disc 12.5 $cm^2$ in area. The observation conditions correspond to viewing with an angle of opening of 10°. In the measurements given the specular component is excluded.

L* provides a measure of the reflectance (light/dark shade) and thus varies from 100 (white) to 0 (black).

a* and b* are the values of the color tendencies:

positive a*=red negative a*=green positive b*=yellow negative b*=blue

L* therefore represents the variation from black to white, a* the variation from green to red and b* the variation from yellow to blue.

Thus, according to the present invention, and especially in the particular case where the mixed oxide corresponds to the formula $Y_2BaCuO_5$, it is possible to provide pigments exhibiting the following quite remarkable chromaticity coordinates:

(1) L* at least equal to 30, preferably at least equal to 40 and more preferably at least equal to 50, (2) a* less than −20, preferably less than −30 and more preferably less than −40, (3) b* generally ranging from 0 to 30, preferably ranging from 10 to 20.

Such coordinates, and in particular the chromaticity coordinate a*, correspond to an intense green hue which is quite exceptional and equivalent or even superior to that of the reference green pigments such as, for example, chromium oxide. In addition, one of the advantages of the pigments according to the invention is that they do not exhibit the toxicity associated with the presence of heavy metals, as is generally the case in the pigments of the prior art.

In the particular event that the mixed oxide corresponds to the formula $Y_2Cu_2O_5$, the pigment according to the invention exhibits chromaticity coordinates L* and a* which have values in the same range as that described above in the case of $Y_2BaCuO_5$ and a b* coordinate which is strictly lower than 0.

As indicated above, the present invention also features a process for the industrial scale production of the subject novel pigments/colorants.

In the first step of this process, a mixture is prepared based on soluble salts of the elements R, M and M'.

According to the invention, from a practical standpoint, salts which are soluble in an aqueous medium are preferably employed, this because the final mixture obtained is itself an aqueous mixture. The use of a mixture in an organic liquid phase is, of course, also within the scope of the invention, but is simply more complicated.

Exemplary salts which are soluble in an aqueous medium and suitable for the present invention include, in particular, the nitrates and halides and especially the chlorides, acetates and sulfates. The process is preferably carried out using nitrates.

The selection of the elements R, M and M' from among those indicated above is, of course, a function of the composition of the pigment sought to be prepared.

Similarly, the amounts and proportions of salts of these elements used in the process of the invention are adjusted conventionally to provide in the mixture a rare earth(s)/divalent metal(s) molar ratio which corresponds to the stoichiometry of the desired final product, namely, preferably 2/1/1 (defined ternary mixed oxide) or 2/2 (defined binary mixed oxide). In certain instances, it may be necessary to heat and maintain the mixture at a temperature which is sufficient for the salts to remain in the soluble state therein; this is true in particular when employing, for example, barium salts, in particular barium nitrate.

With the initial mixture thus obtained, it is next dried in the second step of the process of the invention.

Such drying can be carried out by any means per se known to this art, for example, by drying in an oven or in a furnace.

However, in a preferred embodiment of the invention, spray drying is employed, namely, drying by spraying the initial mixture (aqueous or organic, but preferably aqueous) of salts into a hot atmosphere.

The spraying may be carried out using any sprayer per se known to this art, for example, a spray nozzle of the watering rose or other type. The so-called turbine sprayers can also be used. The various spraying techniques suitable for the process of the invention are described in the basic text by Masters entitled "pray-drying" (second edition, 1976, published by George Godwin—London).

In another preferred embodiment of the invention, the spray drying is carried out in a "flash" reactor, for example, of the type developed by the assignee hereof and described, especially, in published French Patent Applications Nos. 2,257,326, 2,419,754 and 2,431,321. In such a spray-drying process, the process gases (hot gases) are downwardly propelled in a helical path and flow into a vortex. The mixture to be dried is then injected along a trajectory coincident with the axis of symmetry of the helical trajectories of said gases, and this permits the momentum of the gases to be transferred completely to the mixture to be treated. The hot gases thus perform a dual function: on the one hand, the spraying, i.e., the conversion or disintegration of the initial mixture into fine droplets and, on the other hand, the drying of the droplets obtained. Furthermore, the extremely short residence time (generally less than approximately 1/10 of a second) of the particles in the reactor additionally presents the advantage, inter alia, of limiting possible risks of overheating as a result of an excessively long contact with the hot gases. Depending on the respective flow rates of the gases and of the solution, the inlet gas temperature may then range from 400° to 600° C. and the outlet temperature of said gases (which is also the outlet temperature of the dried solids) generally ranges from 100° to 300° C.

In general, the temperature of the drying atmosphere may vary over wide limits and depends, especially, on the mean residence time which is desired or to which the sprayed product is subjected once it is in said atmosphere. In practice, the drying conditions (temperature and/or residence time) are determined conventionally such as at least to provide a complete or virtually complete removal of the residual water present in the product, that is to say, overall, until a constant weight is obtained therefor.

In a final stage of the process according to the invention, the product recovered after drying must then be calcined.

Such calcination is carried out at a temperature and for a period of time which are sufficient to obtain the complete formation of the desired mixed oxide, this time period being generally proportionally shorter the higher the temperature. This temperature additionally depends, of course, on the mixed oxide considered, with the result that it is fairly difficult to provide a general rule for this parameter. The degree of formation of mixed oxide may be monitored, for example, by simple X-ray diffraction analyses conducted at various stages of the calcination.

The calcination stage is generally carried out in air, but a calcination conducted, for example, under inert gas is obviously within the scope of the invention.

In practice, the dried product is calcined at a temperature of at least 900° C. and preferably of at least 1,000° C.

At the end of this stage a product is obtained which exhibits a very good phase purity and a very good chromaticity expressed in the L,a*,b* system.

In addition, the product comprises agglomerates which themselves are grains or aggregates; the mean size of such agglomerates is fine and uniform and generally ranges from 2 to 25 microns. With such a size the product can be employed directly as a pigment, especially for ceramics and plastics. This size is essentially controlled by the calcination temperature and/or time period. It will be appreciated that these latter parameters also affect the trichromaticity coordinates L*, a* and b* of the final pigment. Too, the products of the invention may be ground or disintegrated easily, if necessary, in particular for the coloration of plastics. The grinding and/or the disintegration of the agglomerates of the product is carried out such as to adjust the mean particle size of the grains of product to a value ranging from 0.2 to 5 microns, and preferably, less than 2 microns.

To this end, the grinding/disintegration operations conducted using equipment of the air jet mill are quite suitable.

The pigments according to the invention have a very good tint strength and a very good masking power and, consequently, are suitable for the coloration of many materials and substrates, such as plastics, paints, dyes and ceramics. In this respect, the versatility of the pigments according to the invention is one of their predominant advantages.

Thus, more particularly, they can be employed in the coloration of plastics which may be of the thermoplastic or thermosetting type.

Exemplary thermoplastic resins which can be colored according to the invention include polyvinyl chloride, polyvinyl alcohol, polystyrene, styrene/butadiene, styrene/acrylonitrile and acrylonitrile/butadiene/styrene (ABS) copolymers, acrylic polymers, especially polymethyl methacrylate, polyolefins such as polyethylene, polypropylene, polybutene and polymethylpentene, cellulose derivatives such as, for example, cellulose acetate, cellulose acetobutyrate and ethyl cellulose and polyamides, including polyamide 66.

Exemplary thermosetting resins which can be pigmented according to the invention include phenolic plastics, amino plastics, especially urea formaldehyde and melamine formaldehyde copolymers, epoxy resins and heat-curable polyesters.

The pigments of the invention can also be used in specialty polymers such as fluoropolymers, in particular polytetrafluoroethylene (PTFE), polycarbonates, silicone elastomers and polyimides.

In this specific application for the coloration of plastics, the pigments of the invention can be used directly in powder form. They can also, preferably, be used in a predispersed form, for example, as a premix with a fraction of the resin, in the form of a paste concentrate or of a liquid, which permits same to be introduced at any stage in the manufacture of the resin. This latter attribute presents a particularly great advantage of the pigments according to the invention.

Thus, the pigments according to the invention can be incorporated into plastics such as those indicated above, in a weight proportion which generally ranges either from 0.01% to 5% (with respect to the final product) or from 40% to 70% in the case of a concentrate.

The pigments of the invention can also be employed in the field of paints and varnishes and, more particularly, in the following resins: alkyd resins the most common of which is glycerophthalic, resins modified with tall or short oil, acrylic resins derived from esters of acrylic (methyl or ethyl) and methacrylic acid optionally copolymerized with ethyl, 2-ethylhexyl or butyl acrylate, vinyl resins such as, for example, polyvinyl acetate, polyvinyl chloride, polyvinylbutyral and polyvinylformal, and vinyl chloride and vinyl acetate or vinylidene chloride copolymers, aminoplastic or phenolic resins, in most cases modified, polyester resins, polyurethane resins, epoxy resins and silicone resins.

The pigments are generally used in a proportion of 5% to 30% by weight of the paint and from 0.1% to 5% by weight of the varnish.

The pigments of the invention are also suitable for the coloration of ceramics such as, for example, porcelain, crockery and earthenware, this being effected either by pigmenting the ceramic throughout (physical mixture of ceramic powder and pigment) or by pigmenting only the face surface thereof by means of glazes (glassy coating compositions) containing the pigment.

In this application, the amount of pigments used generally ranges from 1% to 30% by weight relative either to the entire or complete ceramic or relative to the glaze alone.

Lastly, the novel pigments according to the invention are also suitable for applications in the rubber industry, especially in floor coverings, in the paper industry and in printing inks, in the field of cosmetics and many other uses, such as, for example, leather finishing and laminated coatings for kitchens and other work surfaces and in dyes.

In order to further illustrate the present invention and the advantages thereof, the following specific examples are given, it being understood that same are intended only as illustrative and in nowise limitative.

In said examples to follow, the synthesis and characterization of certain pigments according to the invention are set forth, as well as applications thereof in the field of the coloration of plastics.

EXAMPLE 1

This Example illustrates the synthesis of a pigment of the invention based on the mixed oxide $Y_2BaCuO_5$.

The following materials were mixed in a beaker:

(i) 300 ml of an aqueous 1.33M yttrium nitrate solution, (ii) 200 ml of an aqueous 1.0M copper nitrate solution, (iii) 52.3 g of barium nitrate.

Water was then added to provide 800 ml of mixture.

The mixture was then heated, with stirring, to dissolve the barium nitrate completely and thus to homogenize the solution.

This solution was then spray-dried (Büchi sprayer).

A powder was thus collected which next calcined in air for 3 hours at 950° C.

The calcined product was a green powder, phase-pure and corresponding to the phase $Y_2BaCuO_5$ and whose characteristics were the following:

(a) mean particle size
(Cilas)
$\phi_{50}$=2.2 microns
scatter index I=0.8
$(I=\sigma/m=(O_{84}-O_{16})/2\phi_{50}$ (b) chromaticity coordinates:
L*=67.5
a*=−30
b*=18

The X-ray diffraction spectrum of the calcined product is shown in the FIGURE of Drawing.

EXAMPLE 2

The procedure of Example 1 was repeated exactly, except that the calcination stage was carried out for 8 hours at 1,000° C.

A green powder was then obtained whose characteristics were as follows:

(a) particle size:
$\phi_{50}$=3 microns
I=0.6

(b) chromaticity coordinates:
L*=60.4
a*=−39.3
b*=20.9

EXAMPLE 3

The procedure of Example 1 was repeated exactly, except that the calcination stage was carried out for three hours at 1,160°.

A green powder was then obtained whose characteristics were as follows:

(a) particle size:
$\phi_{50}$=5.2 microns
I=0.5

(b) chromaticity coordinates:
L*=52
a*=−40
b*=20.

EXAMPLE 4

This Example illustrates the synthesis of a pigment of the invention based on the mixed oxide $Sm_2BaCuO_5$.

The following materials were mixed in a beaker:

(i) 494 ml of an aqueous 0.81M samarium nitrate solution, (ii) 200 ml of an aqueous 1.0M copper nitrate solution, (iii) 52.3 g of barium nitrate.

The procedure was then as in Example 1 above (dilution to 800 ml, heating, Büchi spray drying), except that the product recovered after drying was calcined for 3 hours at 1,160° C.

After calcination a phase-pure green powder was recovered whose characteristics were as follows:

(a) X-ray identification:
$Sm_2BaCuO_5$ phase (b) mean particle size:
(Cilas):
$\phi_{50}$=4.8 microns
I=0.62

(b) chromaticity coordinates:
L*=30.5
a*=−11.3
b*=5.9

EXAMPLE 5

This Example illustrates the synthesis of a pigment of the invention based on the mixed oxide $Yb_2BaCuO_5$.

The following materials were mixed in a beaker:

(i) 161 ml of an aqueous 1.86M ytterbium nitrate solution, (ii) 36.24 g of copper nitrate trihydrate, (iii) 39.22 g of barium nitrate.

The mixture thus obtained was then heated with stirring on a hot plate, until the water had completely evaporated.

The solid product thus recovered was ground and then calcined for 3 hours at 1,100° C.

At the end of this calcination a green powder was recovered, whose characteristics were as follows:

(a) mean particle size
(Cilas):
$\phi_{50}$=3 microns (b) chromaticity coordinates:
L*=30.8
a*=−10.9
b*=5.45

EXAMPLE 6

This Example illustrates the synthesis of a pigment of the invention based on the mixed oxide $Y_2Cu_2O_5$.

The following materials were mixed in a beaker:

(i) 70 ml of an aqueous 2.9M yttrium nitrate solution, (ii) 48.35 g of copper nitrate trihydrate.

The mixture thus obtained was stirred to homogenize it and then spray-dried (Büchi sprayer).

A powder was collected which was subsequently calcined for 3 hours at 1,000° C.

A powder was thus obtained having a hue with a green dominant, but nevertheless verging on blue, and whose characteristics were as follows:

(a) mean particle size
(Cilas):
$\phi_{50}$ =2.9 microns
(b) chromaticity coordinates:
L*=43.4
a*=−22.5
b*=11.9

EXAMPLE 7

This Example illustrates the synthesis of a pigment of the invention based on a mixed oxide of overall formula $Y_2Ba_{0.5}Cu_{1.5}O_5$.

The following materials were mixed in a beaker:
(i) 69 ml of an aqueous 2.9M yttrium nitrate solution,
(ii) 36.25 g of copper nitrate trihydrate,
(iii) 13.06 g of barium nitrate.

Water was then added (dilution) to provide 300 ml of mixture.

The mixture was then heated with stirring to dissolve the barium nitrate completely and thus to obtain a homogeneous solution.

This solution was then spray-dried (Büchi sprayer).

A powder was thus recovered which was next calcined for 3 hours at 950° C.

After calcination a green powder was obtained whose characteristics were as follows:
(a) mean particle size
(Cilas):
$\phi_{50}$=2.5 microns
(b) chromaticity coordinates:
L*=43.3
a*=15.5
b*=5.5

EXAMPLE 8

This Example illustrates the suitability of the pigments according to the invention for the coloration of plastics.

20 g of a pigment based on $Y_2BaCuO_5$ as prepared in Example 2 ($\phi_{50}$=3μ; L*=60.4, a*=−39.3, b*=20.9) were mixed in a rotating cube with 2 kg of a polypropylene marketed under the trademark Eltex P HV 001.

The mixture was then extruded at 180° C. using a ZSK 30 twin-screw extruder (marketed by Werner and Pfleiderer).

The granules obtained were then injection molded at 220° C. using an Arburg 350-90-220 D injection press with a 41-second cycle.

The mold was maintained at a temperature of 35° C.

A parallepipedal test piece was thus obtained with a double thickness (2 mm and 4 mm) which had a width of 49 mm and a length of 69 mm. This test piece exhibited a very fine and uniform green hue.

The chromaticity coordinates of this test piece, measured on the thick part thereof (4 mm) were then as follows:
L*=45.6
a*=−36
b*=20.5

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A pigmented/colored composition comprising a substance to be colored and a coloring effective amount of agglomerates, grains, or mixtures thereof of a pigment made of at least one mixed oxide of the formula (I):

$$R_2M_xCu_yO_5$$

in which R is yttrium, a rare earths metal having an atomic number ranging from 62 to 71, inclusive, or combination thereof; M is barium, magnesium, calcium, or strontium; and x and y are two numbers, the sum x+y of which is equal to 2, said substance being different from said mixed oxide and being a synthetic resin, natural rubber, porcelain, crockery, earthenware, paper, dye, cosmetic, ink, or coating composition.

2. The pigmented/colored composition as defined by claim 1, wherein said substance is a synthetic resin or natural rubber.

3. The pigmented/colored composition as defined by claim 1, wherein said substance is a coating composition.

4. The pigmented/colored composition as defined by claim 3, wherein said coating composition is a paint, varnish, or glaze.

5. The pigmented/colored composition as defined by claim 1, wherein said substance is porcelain, crockery or earthenware.

6. The pigmented/colored composition as defined by claim 1, wherein said substance is paper.

7. The pigmented/colored composition as defined by claim 1, wherein said substance is an ink or dye.

8. The pigmented/colored composition as defined by claim 1, wherein said substance is a cosmetic.

9. The pigmented/colored composition as defined by claim 1, wherein element M is calcium or barium.

10. The pigmented/colored composition as defined by claim 1, wherein the element M is magnesium or strontium.

11. The pigmented/colored composition as defined by claim 1, wherein the element R is yttrium.

12. The pigmented/colored composition as defined by claim 1, wherein x and y are integers.

13. The pigmented/colored composition as defined by claim 1, comprising a mixed oxide of the formula $Y_2BaCuO_5$.

14. The pigmented/colored composition as defined by claim 1, exhibiting a chromaticity L at least equal to 30, and a chromaticity coordinate a* less than or equal to −20.

15. The pigmented/colored composition as defined by claim 14, wherein L is at least equal to 40.

16. The pigmented/colored composition as defined by claim 15, wherein L is at least equal to 50.

17. The pigmented/colored composition as defined by claim 14, wherein a* is less than or equal to −30.

18. The pigmented/colored composition as defined by claim 17, wherein a* is less than or equal to −40.

19. The pigmented/colored composition as defined by claim 1, exhibiting a chromaticity coordinate b* of from 0 to 30.

20. The pigmented/colored composition as defined by claim 19, wherein b* ranges from 10 to 20.

21. The pigmented/colored composition as defined by claim 1, wherein said agglomerate is free of $Y_2Cu_2O_5$.

22. The pigmented/colored composition as defined by claim 1, wherein said mixed metal oxide is prepared by
   (i) formulating a mixed solution, in the requisite stoichiometric proportions, of soluble salts of the elements R, M and M',
   (ii) drying the mixture thus obtained, (iii) calcining the dried product, and (iv) optionally grinding and/or disintegrating the calcined product.

23. A pigmented/colored composition comprising a substance to be colored and a coloring effective amount of a pigment made of at least one mixed oxide of the formula (I):

$$R_2M_xCu_yO_5$$

in which R is yttrium, a rare earth metal having an atomic numbers ranging from 62 to 71, inclusive, or combination thereof; M is barium, magnesium, calcium, or strontium; x and y are two numbers, the sum x+y of which is equal to 2, said mixed oxides being in the form of agglomerates having a mean particle size of between 2 and 25 microns, said substance being different from said mixed oxide and being a synthetic resin, natural rubber, porcelain, crockery, earthenware, paper, cosmetic, ink, paper, dye or coating composition.

24. The pigmented/colored composition as defined by claim 23, wherein said substance is a coating composition.

25. A pigmented/colored composition comprising a substance to be colored and a coloring effective amount of a pigment made of at least one mixed oxide of the formula (I):

$$R_2M_xCu_yO_5$$

in which R is yttrium, a rare earth metal having an atomic number ranging from 62 to 71, inclusive, or combination thereof; M is barium, magnesium, calcium, or strontium; and x and y are two numbers, the sum x+y of which is equal to 2, said mixed oxides being in the form of agglomerates having a mean particle size of between 2 and 25 microns, said agglomerates comprising grains having a mean size of between 0.2 and 5 microns, and said substance being different from said mixed oxide and being a synthetic resin, natural rubber, porcelain, crockery, earthenware, paper, cosmetic, ink, dye or coating composition.

26. The pigmented/colored composition as defined by claim 25, wherein said substance is a coating composition.

27. A pigmented/colored composition comprising a substance to be colored and a coloring effective amount of a pigment made of at least one mixed oxide of the formula (I):

$$R_2M_xCu_yO_5$$

in which R is yttrium, a rare earth metal having an atomic number ranging from 62 to 71, inclusive, or combinations thereof; M is barium, magnesium, calcium, or strontium; x and y are two numbers, the sum x+y of which is equal to 2, said mixed oxides being in the form of grains having a mean size of between 0.2 and 5 microns, and said substance being different from said mixed oxide and being a synthetic resin, natural rubber, porcelain, crockery, earthenware, paper, cosmetic, ink, dye or coating composition.

28. The pigmented/colored composition as defined by claim 27, wherein said substance is a coating composition.

* * * * *